United States Patent [19]
Takabe et al.
[11] Patent Number: 4,677,577
[45] Date of Patent: Jun. 30, 1987

[54] APPARATUS FOR STATISTICALLY PROCESSING ELEVATOR TRAFFIC INFORMATION

[75] Inventors: Katsunori Takabe; Kenichi Uetani, both of Aichi, Japan
[73] Assignee: Mitsubishi Denki Kabushiki Kaisha, Tokyo, Japan

[21] Appl. No.: 857,506
[22] Filed: Apr. 21, 1986

Related U.S. Application Data

[63] Continuation of Ser. No. 542,819, Oct. 17, 1983, abandoned.

[30] Foreign Application Priority Data

Oct. 19, 1982 [JP] Japan ................................ 57-183312

[51] Int. Cl.[4] .......................... B66B 1/18; G06F 15/20
[52] U.S. Cl. ...................................... 364/554; 187/124
[58] Field of Search ................................ 364/554, 424; 187/29 SC, 29 R

[56] References Cited

U.S. PATENT DOCUMENTS 3,642,099 2/1972 Yuminaka et al. ................ 187/29 R
3,999,631 12/1976 Iwasaka et al. .................... 187/29 R
4,030,571 6/1977 Kaneko et al. .................... 187/29 R
4,149,613 4/1979 Yoneda et al. ..................... 187/29 R
4,418,795 12/1983 Trosky et al. ..................... 187/29 R
4,503,941 3/1985 Takabe ............................. 187/29 R

*Primary Examiner*—Parshotam S. Lall
*Attorney, Agent, or Firm*—Sughrue, Mion, Zinn, Macpeak, and Seas

[57] ABSTRACT

An apparatus for statistically processing elevator traffic information by statistically processing traffic information on each building floor in each of a number of time zones of a day to generate group control information, comprising a first statistical data generator device responsive to the traffic information on each floor for issuing a total value of the traffic information as a statistical value, a second statistical data generator device for issuing as a statistical value the ratio of the traffic information on each floor to the absolute value of traffic information, and a control converter device for converting the statistical values from the first and second statistical data generator devices into the group control information.

10 Claims, 6 Drawing Figures

APPARATUS FOR STATISTICALLY PROCESSING ELEVATOR TRAFFIC INFORMATION

This is a continuation of application Ser. No. 542,819 filed 10/17/83 now abandoned.

BACKGROUND OF THE INVENTION

The present invention relates to an apparatus for statistically processing elevator traffic information.

There has been proposed a system for recording various pieces of elevator traffic information, such as elevator traffic density and service condition, and for effecting operational control over a group of elevators. Such a system requires an apparatus for providing statistical data on past elevator traffic density for each floor of the building.

The traffic statistics in a building are such that the traffic density on each floor is proportional to the total traffic density in the building. Stated otherwise, on a day when the total traffic density is increased, the traffic density on each floor is also increased by the same ratio. Conversely, when the total traffic density is reduced, the traffic density on each floor is also reduced. Therefore, it is believed that the ratio of the traffic density on each floor to the traffic density in the entire building remains substantially unchanged. However, where the traffic density on each floor is utilized as direct statistical data, any variation in the total traffic density is reflected in the statistical data on the traffic density on each floor, thus failing to provide stable statistical results. The traffic densities on the respective building floors are considered to vary considerably from each other. Storage of data on the traffic density on all floors requires that a storage capacity be large enough to cover a floor having the maximum traffic density. Accordingly, the apparatus requires a considerable number of memory devices.

SUMMARY OF THE INVENTION

It is an object of the present invention to provide an apparatus for statistically processing elevator traffic information by finding the ratios of the sum of traffic information data on respective building floors to traffic information on the respective floors, to thereby provide statistical results stable against variations in the absolute traffic density, that is, the total traffic density, and to thereby reduce the number of memory devices used.

According to the present invention, there is provided an apparatus for statistically processing elevator traffic information by statistically processing traffic information on each building floor in each of a number of time zones of a day to generate group control information, comprising a first statistical data generator device responsive to the traffic information on each floor for issuing an absolute or total value of the traffic information as a statistical value, a second statistical data generator device for issuing as a statistical value the ratio of the traffic information on each floor to the absolute value of traffic information, and a control converter device for converting the statistical values from the first and second statistical data gĕnerator devices into group contol information.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
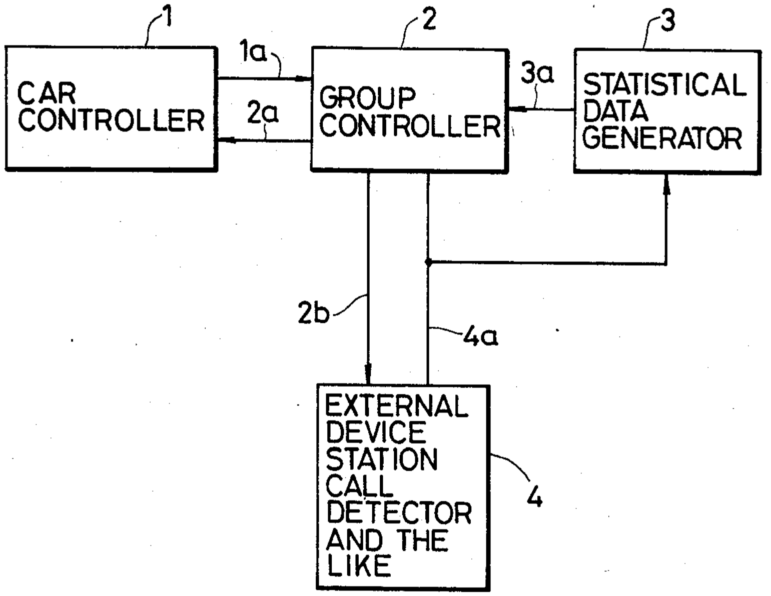
FIG. 1 is a block diagram of an apparatus for statistically processing elevator traffic information according to the present invention.

An apparatus for statistically processing elevator traffic information according to the present invention generally comprises, as shown in FIG. 1, an elevator car controller 1, a group controller 2, a statistical data generator 3 for generating statistical data on elevator traffic information and service information, and an external device 4 such as a station call detector or the like. The car controller 1 issues a car position signal to the group controller 2, which issues a station call assignment signal indicative of a station call assignment to the car controller 1. The group controller 2 issues a notice lamp energization signal and a station call registration erase signal to the external device 4. The statistical data generator 3 delivers a predictive station call generation interval signal 3*a* to the group controller 2. The external device 4 issues a station call registration signal 4*a* to the group controller 2 and to the statistical data generator 3.

FIGS. 2 through 5 show the statistical data generator 3 in greater detail. Let a day be divided into m preset time zones, possibly equal hourly zones, in which case m=24. The statistical data generator 3 includes as many sections shown in FIG. 3 as there are time zones m.

Figure 2:
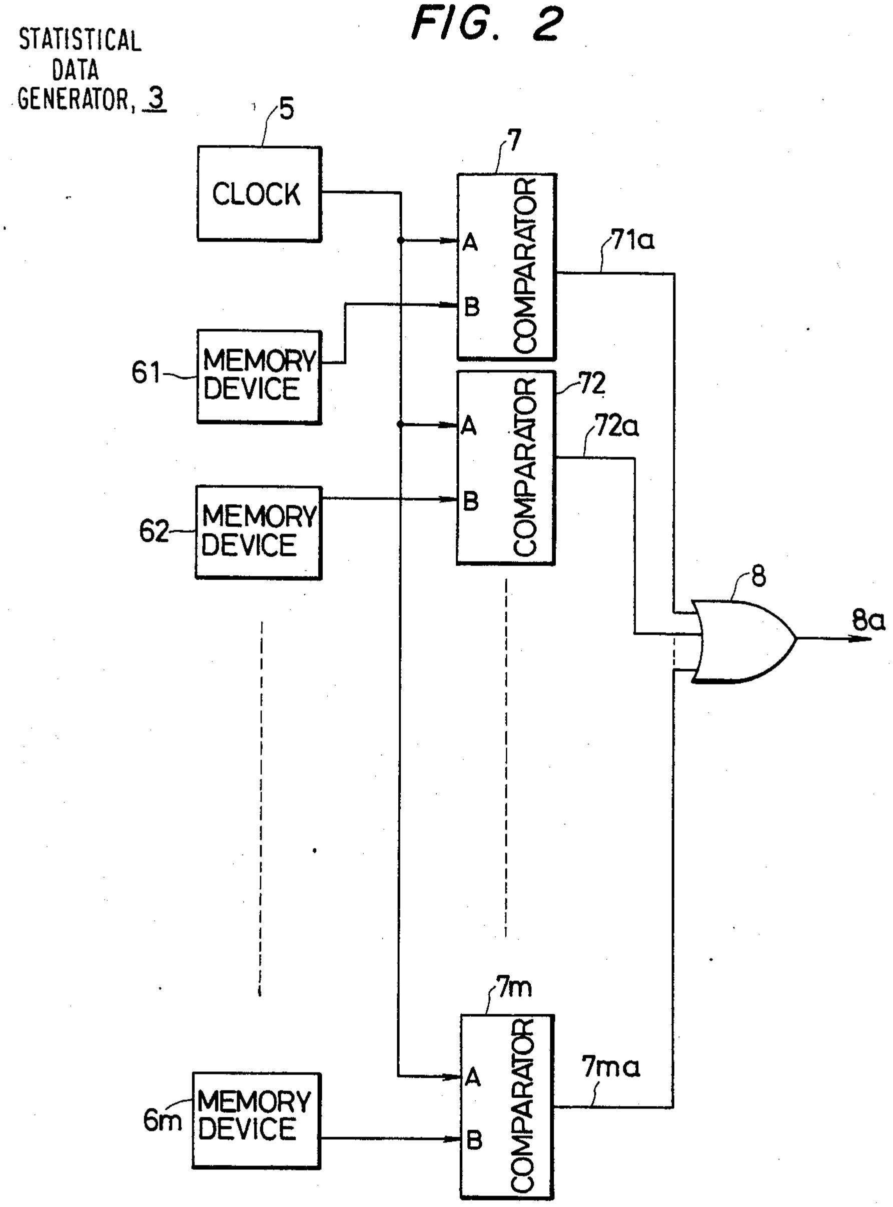

As shown in FIG. 2, the statistical data generator 3 includes a clock 5 for issuing a time signal indicative of the present hour and minute, memory devices 61–6*m* storing the ending times of preset time zones, respectively, comparators 71–7*m* for producing time zone ending signals 71*a*–7*ma*, respectively. These signals have a high logic level when an output applied from the clock 5 to an input terminal A is equal to outputs applied from the memory devices 61–6*m* to an input terminal B, and the signals have a low logic level when the inputs A, B are different from each other. These signals 71*a*–7*ma* are combined in an OR gate which produces a time zone ending signal 8*a*.

Figure 3:
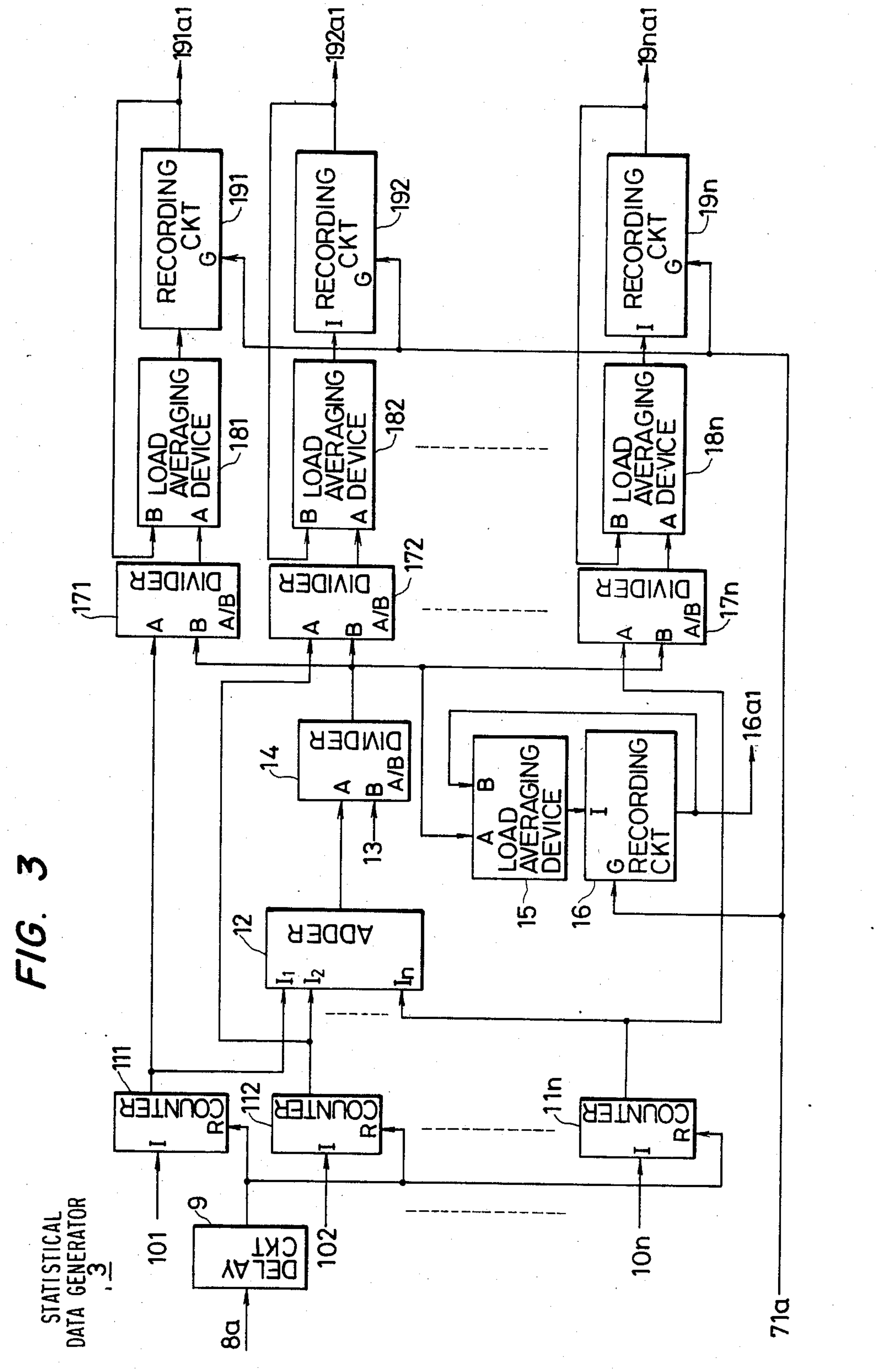
Figure 4:
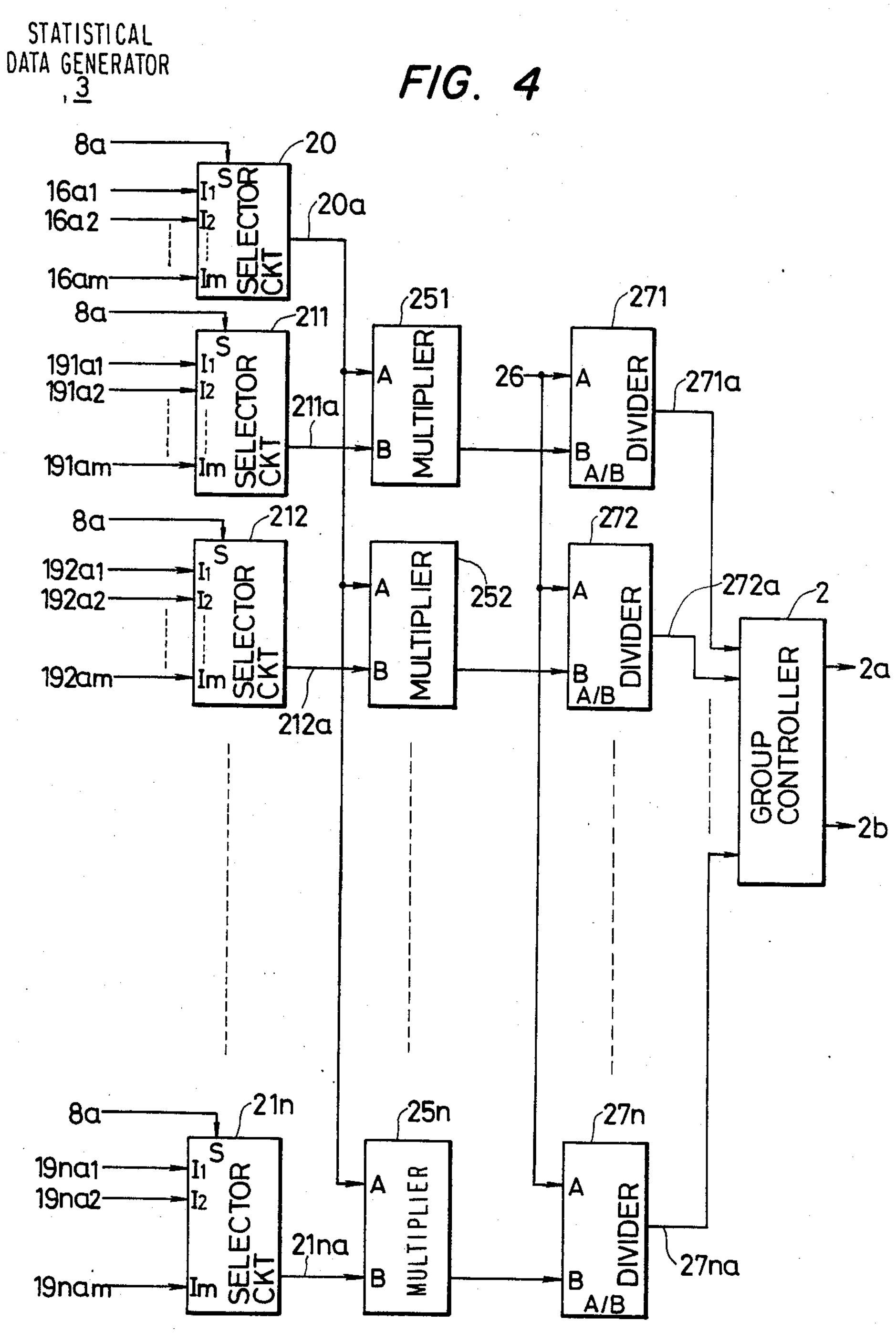

As shown in FIG. 3, the statistical data generator 3 also includes a delay circuit 9 for producing an output signal of a high logic level after a time delay when the input signal 8*a* goes high, counters 111–11*n* supplied with station call registration signals 101–10*n* which go high when station calls are registered on the respective floors, for counting and outputting the number of high input signals applied at their input terminals I. The counters 111–11*n* are reset when an output applied from the delay circuit 9 to a reset terminal R goes high. The statistical data generator 3 further includes an adder 12 for adding the outputs from the counters 111–11*n* applied to its input terminals I1, I2, . . . In. A station number signal 13 representative of the number of stations is applied to an input terminal B of a divider 14 which divides an output from the adder 12 applied to an input terminal A by the station number signal 13. A load averaging device 15 serves to weight an output from the divider 14 applied to an input terminal A and an output from a recording circuit 16 (described below) applied to an input terminal B and add them according to the following formula:

$$\frac{1}{N}A + \frac{N-1}{N}B, \quad (1)$$

where N is an integer. A recording circuit 16 records an output from the load averaging device 15 applied to an input terminal I when an input G connected to the time zone ending signal 71*a* goes high, and produces an output 16*a*1 serving as a total traffic signal. Designated in FIG. 4 are total traffic signals 16*a*1–16*am* in respective time zones originating from the recording circuit of FIG. 3. In FIG. 3, the statistical data generator 3 also includes dividers 171–17*n* identical to the divider 14, load averaging devices 181–18*n* identical to the load averaging device 15, and recording circuits 191–19*n* identical to the recording circuit 16. It is to be appreciated that FIG. 3 is duplicated for each of the m time zones with the proper time zone ending signal 72*a*–7*ma* replacing the signal 71*a*.

Figure 5:
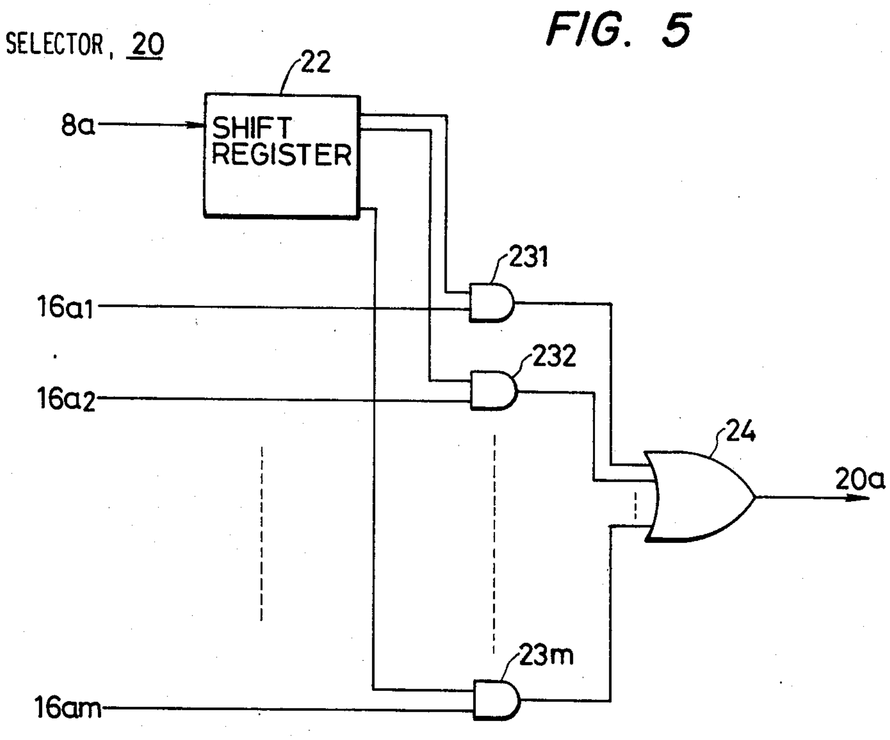
FIGS. 2 through 5 are block diagrams of a statistical data generator in the apparatus shown in FIG. 1.

Designated in FIG. 4 are floor variation degree signals 191*a*1–191*am* generated from the recording circuits 191*a*1–191*am*, floor variation degree signals 192*a*1–192*am* to 19*na*1–19*nam* in the respective time zones. The statistical data generator 3 in FIG. 4 has a selector circuit 20 for switching inputs I1–Im successively to an output 20*a* each time an input S applied thereto goes high, and selector circuits 211–21*n* for issuing outputs 211*a*–21*na*, respectively. As shown in FIG. 5, the selector circuit 20 comprises a shift register 22 for producing one high output signal which is successively shifted each time an input 8*a* applied thereto goes high, AND gates 231–23*m*, and an OR gate 24, In FIG. 4, multipliers 251–25*n* serve to multiply the output 20*a* from the selector circuit 20 applied to input terminals A by the outputs 211*a*–21*na* applied to input terminals B. The statistical data generator 3 further comprises dividers 271–27*n* for dividing time zone length signals 26 indicative of the lengths of the time zones by outputs from the multipliers 251–25*n* to thereby issue predictive station call generation interval signals 271*a*–27*na* as outputs to the group controller 2.

Figure 6:
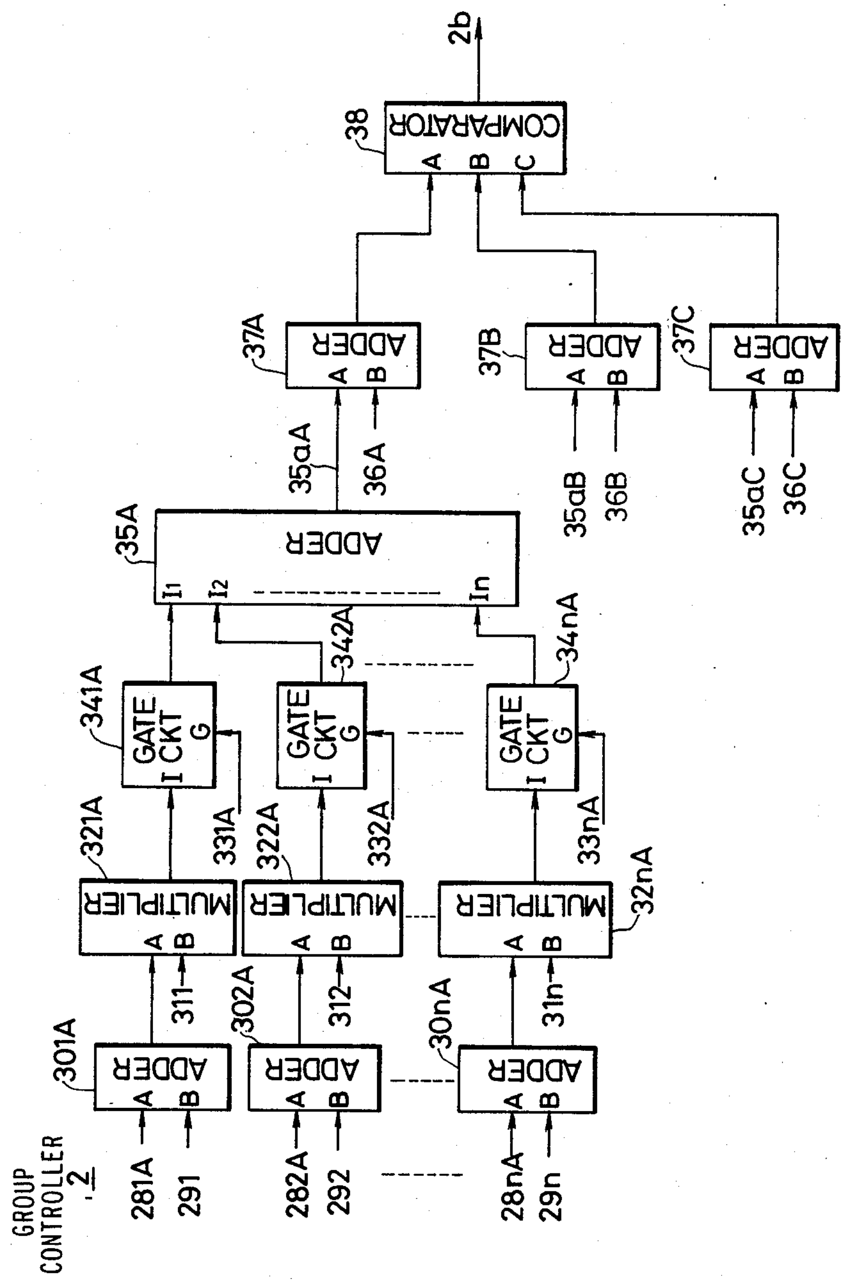
FIG. 6 is a block diagram of a group controller in the apparatus of FIG. 1.

Indicated in FIG. 6 at 281A–28*n*A are wait time signals (the suffix A represents an elevator A) representative of times which have elapsed after station calls have been registered in the respective stations of the elevator A until the present time, and 291–29*n* are predicted arrival time signals representative of times required for the elevator car to arrive at the respective floors after the present time. The circuit for producing the predicted arrival time signals is not shown. The group controller 2 includes adders 301A–30*n*A for adding the signals 281A–28*na* applied to input terminals A and the signals 291–29*n* applied to input terminals B. Multipliers 321A–32*n*A 251–25*n* multiply the outputs applied from the adders 301*a*–30*n*A by signals 311–31*n* which are the reciprocals of the predictive station call generation interval signals 271*a*–27*na*. Gate circuits 341A–34*n*A pass the outputs from the multipliers 321A–32*n*A applied to input terminals I when assignment signals 331A–33*n*A applied to input terminals G go high at the time the elevator A is assigned to respective station calls. An adder 35A identical to the adder 12 adds the applied outputs from the gate circuits 341A–34*n*A to its input terminals I1–In. An adder 37A adds an evaluation output signal 35*a*A from the adder 35A and a predicted arrival time signal 36A indicative of a time required for the elevator A to reach the station for which a station call has been registered. Adders 37B, 37C also add evaluation output signals 36B, 36C from adders (not shown) for respective elevators B, C and their predicted arrival time signals 36B, 36C, respectively. Outputs from the adders 37A, 37B, 37C are applied to input terminals A, B, C of a comparator 38 which selects the applied signals and issues the assignment signal 2*b*.

Operation of the apparatus will now be described.

As shown in FIG. 1, when a station call is registered, the external device 4 issues the station call signal 4*a* to the statistical data generator 3 and the group controller 2. Based on the supplied information, the statistical data generator 3 delivers the predictive station call generation interval signal 3*a* representative of a predicted interval of generation of station calls to the group controller 2. In response to the signal 3*a*, the group controller 2 assigns an elevator car and applies the assignment signal 2*a* to the car controller 1. The car controller 1 then controls the elevator car specified by the assignment signal 2*a*. The group controller 2 issues the signals 2*b* to the external device 4, which energizes the notice lamp for indicating the car assignment and an arrival time and erases the station call registration when the assigned car arrives.

The statistical data generator 3 and the group controller 2 will operate as follows.

The clock 5 in FIG. 2 generates a time signal every minute. When the time signal and any one of the time zone ending time signals stored in the memory devices 61–6*n* coincide with each other, the output from the corresponding comparators 71–7*m*, that is, one of the time zone ending signals 71*a*–7*ma*, goes high. As a result, the OR gate 8 outputs the signal 8*a* indicative of the ending of the corresponding time zone. This signal goes high.

When a station call is registered on one of the floors, one of the station call registration signals 101–10*n* goes high and is counted by the corresponding one of the counters 111–11*n*. The number of station calls is regarded as a traffic density in the illustrated circuit. At the ending time of a time zone for which statistical data is to be gained, the time zone ending signal 8*a* goes high, and the output from the delay circuit 9 goes high after a certain time delay, whereupon the counters 111–11*n* are reset. Therefore, the counters 111–11*n* store the numbers of station calls generated for the respective floors in a certain time zone. The numbers of station calls are then added by the adder 12 to provide a total traffic density. The divider 14 divides the total number of station calls by the station call number signal 13 to provide an average station call number for the stations. The load averaging device 15 effects an arithmetic operation expressed by Equation (1) which corrects the average station call number. If N in Equation (1) is set to 4, then $(\frac{1}{4})A+(\frac{3}{4})B$ is computed. Stated otherwise, the average station call number in the current time zone has a weight of $\frac{1}{4}$, and the average station call number in the previous time zone as recorded by the recording circuit 16 has a higher weight of $\frac{3}{4}$. These numbers are added to produce an average station call number. The average station call number thus obtained is recorded in the recording circuit 16 when the time zone ending signals 71*a*–7*ma* (the first time zone ending signal 71*a* in FIG. 3) go high.

The average station call number issued from the divider 14 and the station call numbers on the respective floors from the counters 111-11$n$ are delivered to the dividers 171-17$n$, which compute the ratios (variation parameter) of the station call numbers on the floors to the average station call number. These ratios on the respective floors are weighted in the manner as described above by the load averaging devices 181-18$n$, thus providing new values of the variation statistics. When a first time zone ending signal 71$a$ applied to the recording circuits 191-19$n$ goes high, the weighted ratios are recorded by the recording circuits 191-19$n$, respectively. Each time the time zone ending signal 8$a$ goes high, the output from the shift register 22 is shifted to open the AND gates 231-23$m$ sequentially to allow the total traffic density signals 16$a$1-16$am$ to pass successively through the OR gate 24 as the output 20$a$.

The selector circuit 20 extracts the total traffic density signal in a certain time zone from the total traffic density signals 16$a$1-16$am$. Likewise, the selector circuits 211-21$n$ extract the variation statistics for the respective floors in a certain time zone from the variation parameter signals 191$a$1 191$am$ . . . 19$na$1-19$nam$. The multipliers 251-25$n$ multiply the output 20$a$ equivalent to the total traffic density in a given time zone by the outputs 211$a$-21$na$ corresponding to the variation parameters in the same time zone to thereby determine predicted station call numbers for the respective floors, The dividers 271-27$n$ divide the time zone length signal 26 indicative of the length of the time zone by the predicted station call numbers to find predictive station call number generation interval signals 271$a$-27$na$ (which are the same as the signal 3$a$ in FIG. 1). Accordingly, the circuit arrangement shown in FIG. 4 serves to convert the statistical data generated by the circuit arrangement of FIG. 3 into group control information.

The adders 301A-30$n$A in the group controller 2 add the wait time signals 28$a$A-28NA indicative of wait times up to the present time for the respective floors and the corresponding predicted arrival time signals 291-29$n$, which represent predicted arrival times from the present time, and thereby compute predicted wait times. The multipliers 321A-32$n$A multiply the predicted wait times by the reciprocals of the station call generation interval signals 241$a$-24$n$A, to issue evaluation values. This is because the shorter the interval between generated station calls, the greater the number passengers and the greater the possibility of the car's becoming full and of additional elevator cars being called, thus the evaluation values are increased to provide less tendency of an elevator car to be assigned. The evaluation values generated as outputs from the multipliers 321A-32$n$A are applied to the adders 35A only when the gate circuits 341A-33$n$A are opened, that is, when the assignment signals 331A-33$n$A are high. The adder 34A adds the outputs from the gate circuits 341A-34$n$A and produces an evaluation signal 35$a$A. The evaluation signals 35$a$B, 35$a$B, 35$a$C for the elevators A, B, C, respectively, are added to predicted arrival time signals 36A-36C, respectively, by the adders 37A-37C. Those evaluation values which are subjected to the influence of already assigned station calls are applied to the comparator 38. The comparator 38 selects the smallest one of these applied evaluation values and issues an assignment signal 2$b$ to assign the corresponding elevator car to service.

While in the foregoing embodiment the traffic density has been defined as the number of station calls, it may be defined as other types of elevator traffic information such as the number of passengers entering and leaving the elevator on each floor, a service condition such as a wait time on each floor, and other information.

To cope with variations in the entire traffic density dependent on the days of the week, the average traffic density is recorded for each day and the traffic density on each floor can be determined from the ratio with respect to the average traffic density. This provides an effective statistical data generating apparatus in applications in which a limited storage capacity is available.

With the foregoing arrangement, the absolute amount of elevator traffic information on each floor and the ratio of traffic information on each floor to the absolute amount of elevator traffic information are employed as statistical data which will be given as group control information. This allows the statistical data on each floor to vary less than the variation in the absolute total of elevator traffic. As a result, optimum statistical data can be provided for traffic conditions in a building. Since the above ratio falls within a certain range, the required capacity of memory devices can be reduced.

Although a certain preferred embodiment has been shown and described, it should be understood that many changes and modifications may be made therein without departing from the scope of appended claims.

What is claimed is:

1. An apparatus for statistically processing traffic information, that is, information on the use and operation of all of one or more elevators, by statistically processing traffic information on each building floor to generate group control information for the operational control of said elevators, comprising:

first means responsive to said traffic information on each floor for calculating a sum of said traffic information on each floor and issuing said sum as a total value;

second means for computing and issuing the ratio of the traffic information on each floor to said total value;

a control converter device for converting said total value and said ratio from said first and second means into the group control information.

2. An apparatus according to claim 1, wherein each of said first and second means multiplies present and past inputs of said traffic information by separate coefficients which differ according to the time periods of said inputs, thereby forming products, and adds the products, thereby forming a time weighted sum.

3. An apparatus according to claim 1, wherein said first and second means operate independently in each of a number of preset time zones within a day.

4. An apparatus according to claim 1, wherein said first means calculates a sum of station calls on each floor and issues said sum as a total value.

5. An apparatus according to claim 4, wherein said first means calculates the sum of the station calls on each floor at every predetermined period of time.

6. An apparatus according to claim 4, wherein said second means divides the sum of station calls on each floor by a number of floors, thereby giving a mean number of station calls per one floor, computes a ratio of the number of station calls on each floor to the mean number of station calls, and issues said ratio.

7. An apparatus according to claim 6, wherein said second means multiplies a present ratio by a first coefficient and multiplies a past ratio by a second coefficient wherein said first coefficient is smaller than said second coefficient, adds the products of the two multiplications, and issues to said control converter device a sum of said products as said ratio of the traffic information on each floor to said total value.

8. An apparatus according to claim 6, wherein said second means multiplies a present mean number of station calls by a third coefficient and multiplies a past mean number of station calls by a fourth coefficient wherein said third coefficient is smaller than said fourth coefficient, adds the products of the two multiplications, and issues a sum of said products as said mean number of station calls.

9. An apparatus according to claim 6, wherein said control converter device receives said ratio and said mean number of station calls, and in accordance therewith implements predictive computation of a number of station calls.

10. An apparatus according to claim 9, wherein said control converter device divides a time signal having a predetermined duration by a number of predicted station calls to give a value indicative of a time interval between two successive station calls, and issues said value as said group control information.

* * * * *